Figure 1:
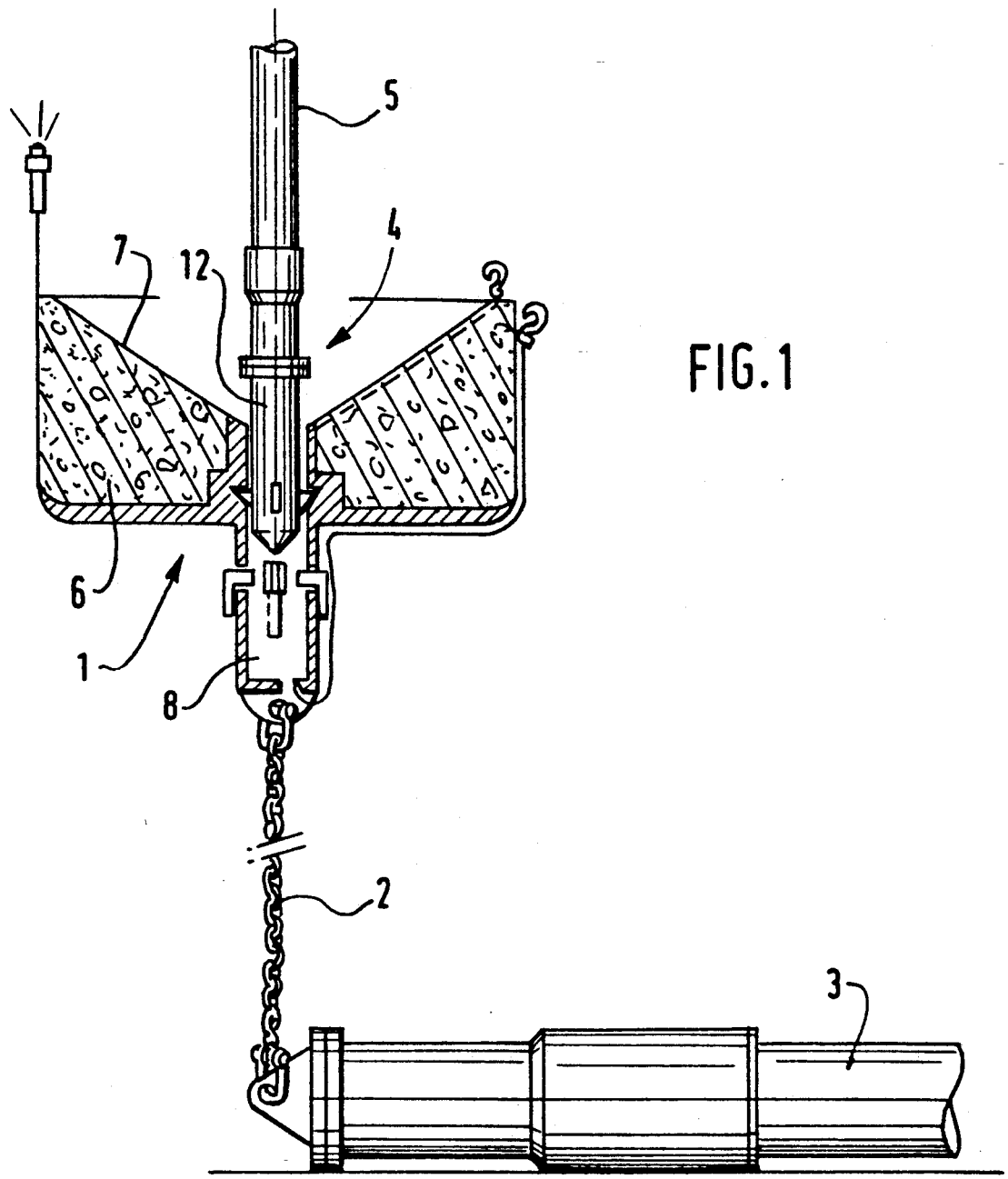

United States Patent [19]

Maloberti et al.

[11] Patent Number: 5,318,384
[45] Date of Patent: Jun. 7, 1994

[54] DEVICE FOR DEPOSITING AND RECOVERING A HEAVY LOAD ON THE OCEAN FLOOR

[75] Inventors: René Maloberti, Clampigny; Alain Coutarel, Paris; Guy Jahant, Fayence, all of France

[73] Assignee: COFLEXIP, Boulogne-Billancourt, France

[21] Appl. No.: 776,393

[22] PCT Filed: Apr. 2, 1991

[86] PCT No.: PCT/FR91/00265
§ 371 Date: Jan. 29, 1992
§ 102(e) Date: Jan. 29, 1992

[87] PCT Pub. No.: WO91/15397
PCT Pub. Date: Oct. 17, 1991

[30] Foreign Application Priority Data

Mar. 30, 1990 [FR] France .................. 90 04098

[51] Int. Cl.⁵ .................................................. F16L 1/04
[52] U.S. Cl. ................................... 405/173; 405/158; 405/188; 405/191; 166/338; 166/341
[58] Field of Search .............. 405/173, 171, 158, 188; 166/338, 339, 340, 343, 341, 342

[56] References Cited

U.S. PATENT DOCUMENTS

| | | |
|---|---|---|
| 2,986,750 | 6/1961 | Herreshoff . |
| 3,032,125 | 5/1962 | Hiser et al. . |
| 3,360,042 | 12/1967 | Marion ................................. 166/340 |
| 3,626,527 | 12/1971 | Brown ............................. 166/340 X |
| 3,788,396 | 1/1974 | Shatto et al. ........................ 166/341 |
| 4,109,728 | 8/1978 | Sanford . |
| 4,117,693 | 10/1978 | Fournie ............................. 405/171 |
| 4,286,665 | 9/1981 | Walker ............................. 166/342 X |
| 4,444,528 | 4/1984 | Scadino et al. ................... 405/173 |
| 4,547,163 | 10/1985 | Langpaap et al. . |
| 4,673,313 | 6/1987 | Baugh et al. ................... 166/341 X |

FOREIGN PATENT DOCUMENTS

| | | |
|---|---|---|
| 0008809 | 1/1989 | Japan ................................. 405/173 |
| 2097449 | 11/1982 | United Kingdom ................ 166/338 |

*Primary Examiner*—Dennis L. Taylor
*Attorney, Agent, or Firm*—Hoffman, Wasson & Gitler

[57] ABSTRACT

A device for depositing and recovering a heavy load on the ocean floor including a first part which can be attached mechanically to a handling and recovery cable and a second part which can be attached mechanically to the load to be deposited. The second part is buoyant and includes means for attaching it flexibly to the load. Each of the two parts include a cylindrical joining element, one of which fits inside the other. The device also includes means for locking and unlocking the cylindrical joining elements.

11 Claims, 10 Drawing Sheets

DEVICE FOR DEPOSITING AND RECOVERING A HEAVY LOAD ON THE OCEAN FLOOR

This invention has as its object a device for releasing and recovering a heavy load on the ocean floor and more particularly such a device making possible the depositing of a load such as a hose to be released or a mooring buoy with a line for lowering or for releasing, such as a cable, a chain or a flexible tubular conduit and allowing its later recovery in particular in great water depths.

The invention also aims at assuring that the element used for the reconnection is always accessible even in case of very soft earth in which the deposited buoy would be totally or partially embedded.

Currently, this work is often performed by divers, but this solution exhibits the drawback of causing high labor costs and further cannot be used at a g great depth.

Also used are disconnectors, such as cable cutters for releasing the load, the take up for lifting being performed using a remote-controlled submarine vehicle manipulating a hook lowered with the lifting line.

This solution exhibits the drawback of not being able to be used for very heavy loads because of the size of the superstructure accessories to be manipulated. Further, the reconnection with the load released on the floor runs the risk of being difficult in the case where the floor consists of soft earth.

It is also possible to keep the end of the release line floating between the floor and the surface by using a buoy line or a cable connected to a subsurface buoy, itself connected by a cable to a marker buoy on the surface with which the recovery is performed.

In this case, the superstructure is complicated and the surface buoy runs the risk of being carried away by a ship or a storm. Further, the line of buoy lines must be of great length and great capacity in the case of heavy loads in great water depths.

This invention aims at overcoming these drawbacks.

For this purpose, the invention has as its object a device for releasing and recovering a heavy load on the ocean floor, comprising a first part able to be connected mechanically to a line for handling and recovery and a second part able to be connected mechanically to the load to be released, characterized by the fact that said second part has a positive buoyancy and comprises flexible means for connection to said load, each of the two parts comprising a cylindrical connecting element able to be fitted into one another, said device further comprising means for locking and unlocking the cylindrical connecting elements.

By cylinder is meant a surface produced by a straight line known as a generatrix, subject, on the one hand, to remain parallel in a fixed direction and, on the other hand, to encounter a main fixed plane curve known as a dirextorix. Preferably, the cylindrical surfaces opposite one another making it possible to perform the fitting of said connecting elements exhibit the shape of circular cylinders.

According to the invention, said second part comprises floating means to exhibit a positive buoyancy and flexible means for connection to said load.

The positive buoyancy makes it possible to assure accessibility to the second part even when the mooring buoy to be recovered is embedded in the ocean floor. Advantageously, the second part is produced so that the axis defined by its center of pressure P and its center of gravity G is parallel to the generatrices of the cylindrical connecting elements and so that center of pressure P is found, relative to center of gravity G, on the side of the upper end of the second part which comprises the upper front face of the cylindrical connecting element, center of gravity G being located relative to center of pressure P on the side of the lower end which comprises the connecting element with the flexible means for connection to the load. The uprightness of the cylindrical connecting element (mandrel, or receiving cylinder according to the adopted embodiment) of the second part, which facilitates the introduction of the mandrel in the receiving cylinder, is thus assured.

The load released on the floor acts as ballast holding said second part in positive buoyancy close to the floor by said flexible connecting means.

Advantageously, one of the two parts comprises a cylindrical mandrel and the other part comprises a receiving cylinder for said mandrel, the locking and unlocking means, advantageously hydraulic, are placed in said cylindrical receiving mandrels. The mandrel can be mounted on the first or the second part.

Advantageously, one of the parts comprises an entry cone to facilitate the guiding of the mandrel carried by the other. More particularly, the mandrel can be mounted on the first part, the second part comprising the receiving cylinder and an entry cone for the mandrel.

In an advantageous embodiment, one of the two cylindrical connecting elements comprises at least one mobile locking means such as a pawl or a swinging catch, working in cooperation with a static locking means integrated in the other cylindrical connecting element and consisting of a cavity made in the wall of the cylindrical element, such as a slot or preferably a groove or a circular groove.

In a particular embodiment of the invention, the locking means comprise at least one element able to project from the mandrel to enter a cavity made in the wall of the receiving cylinder.

This element can be mounted to swing inside the mandrel, elastic means being provided to keep it in extended position, and a piston being designed to bring it into retracted position against the action of the elastic means.

The same mandrel can be used for releasing and recovering the load, but, in a particular embodiment, a separate mandrel is provided for the recovery, the locking means of this mandrel comprising an annular groove made in its outside surface designed to work with catches mounted to pivot on the receiving cylinder. The locking means of the first part can in particular be supplied with power from the line for release and/or recovery, for example, with electric or hydraulic power. In the latter case, the line consists of a flexible tubular conduit.

It is possible to provide, to assure the entry of the mandrel into its receiving cylinder, a cable or a sling going through said entry cone and the receiving cylinder and comprising means for hooking to the end of the mandrel, on the one hand, and to the end of a traction cable, on the other hand.

Figure 2:
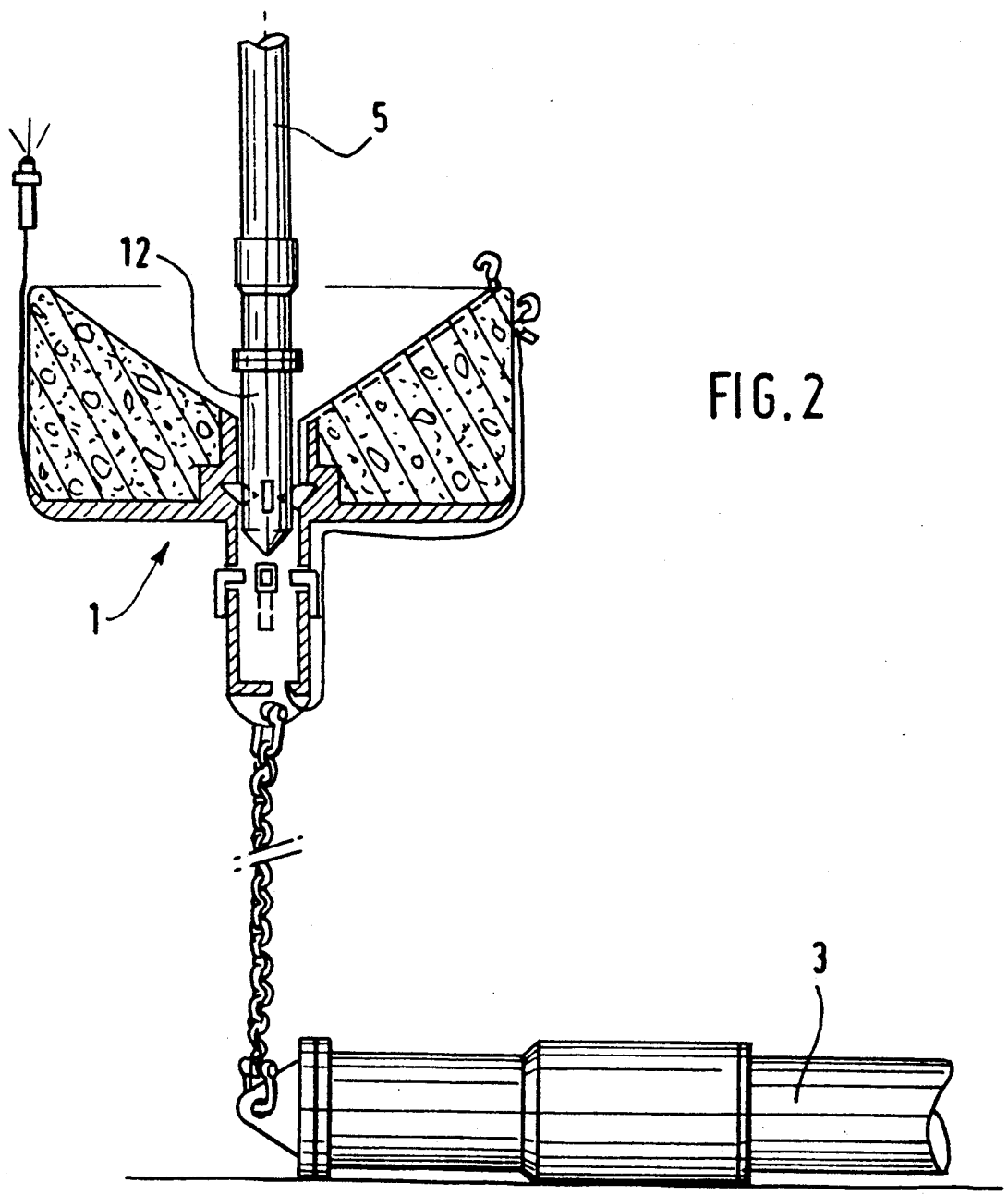
Figure 3:
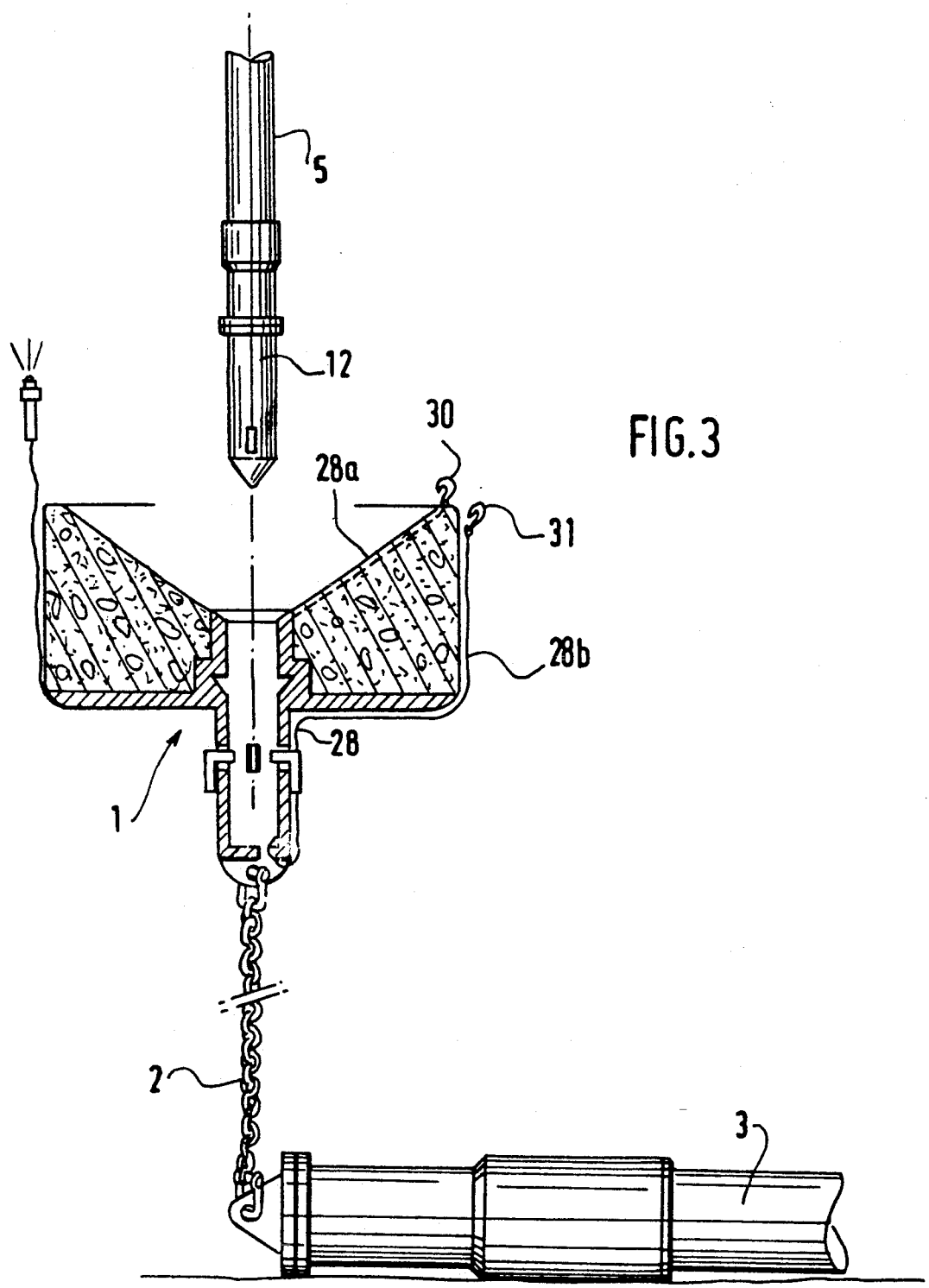
Figure 8:
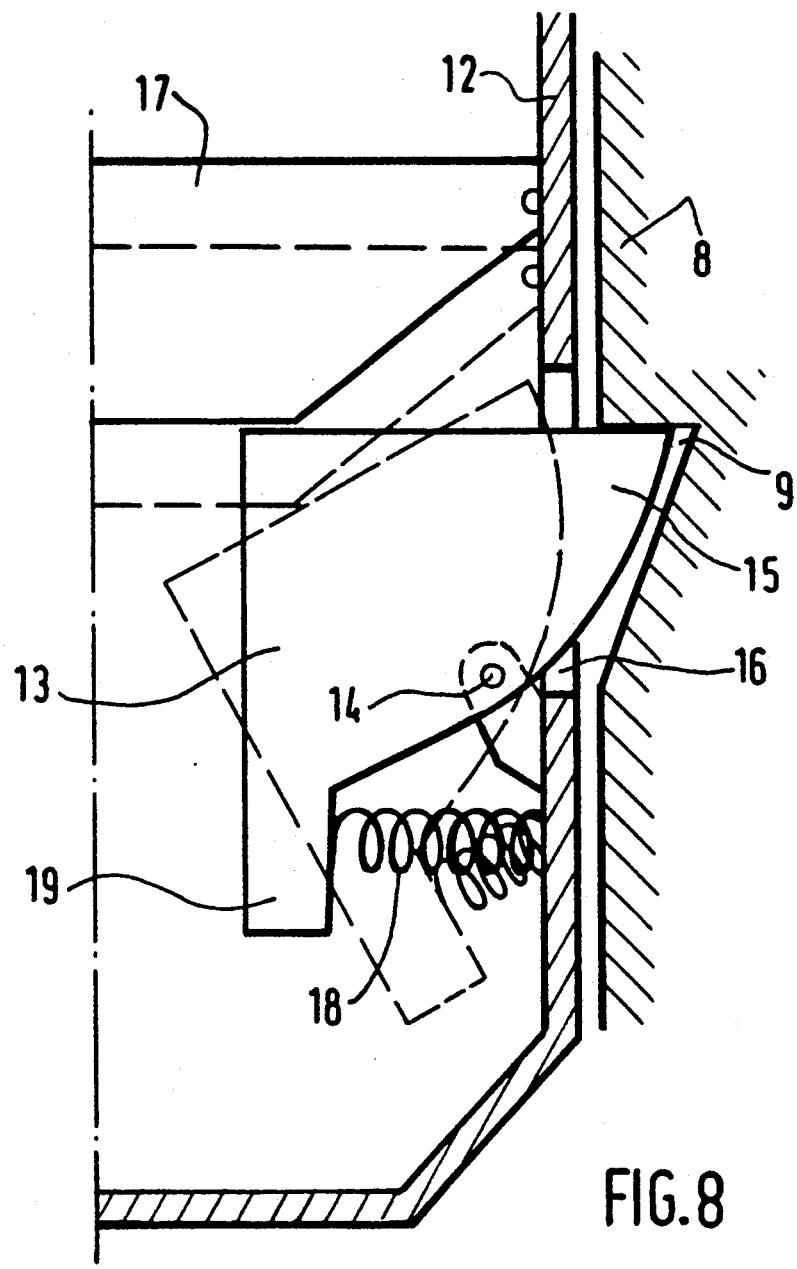
Figure 9:
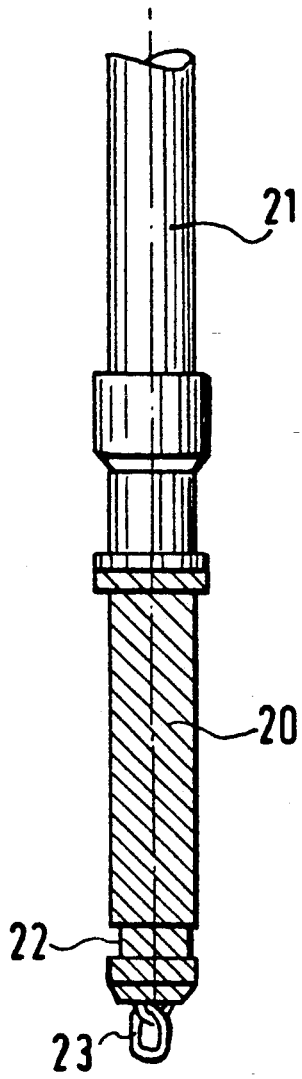
Figure 10:
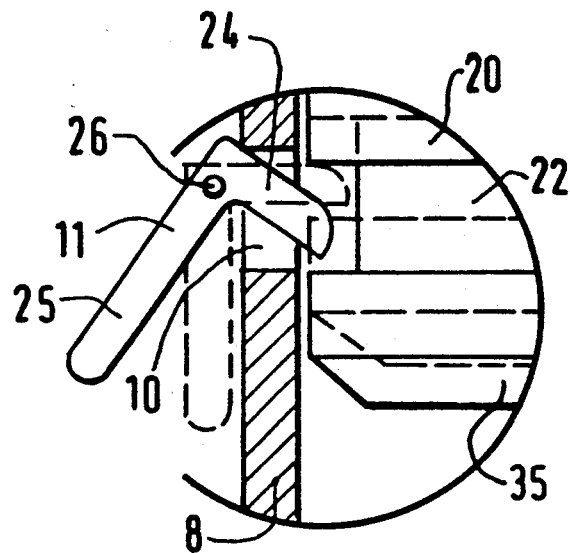
Figure 11:
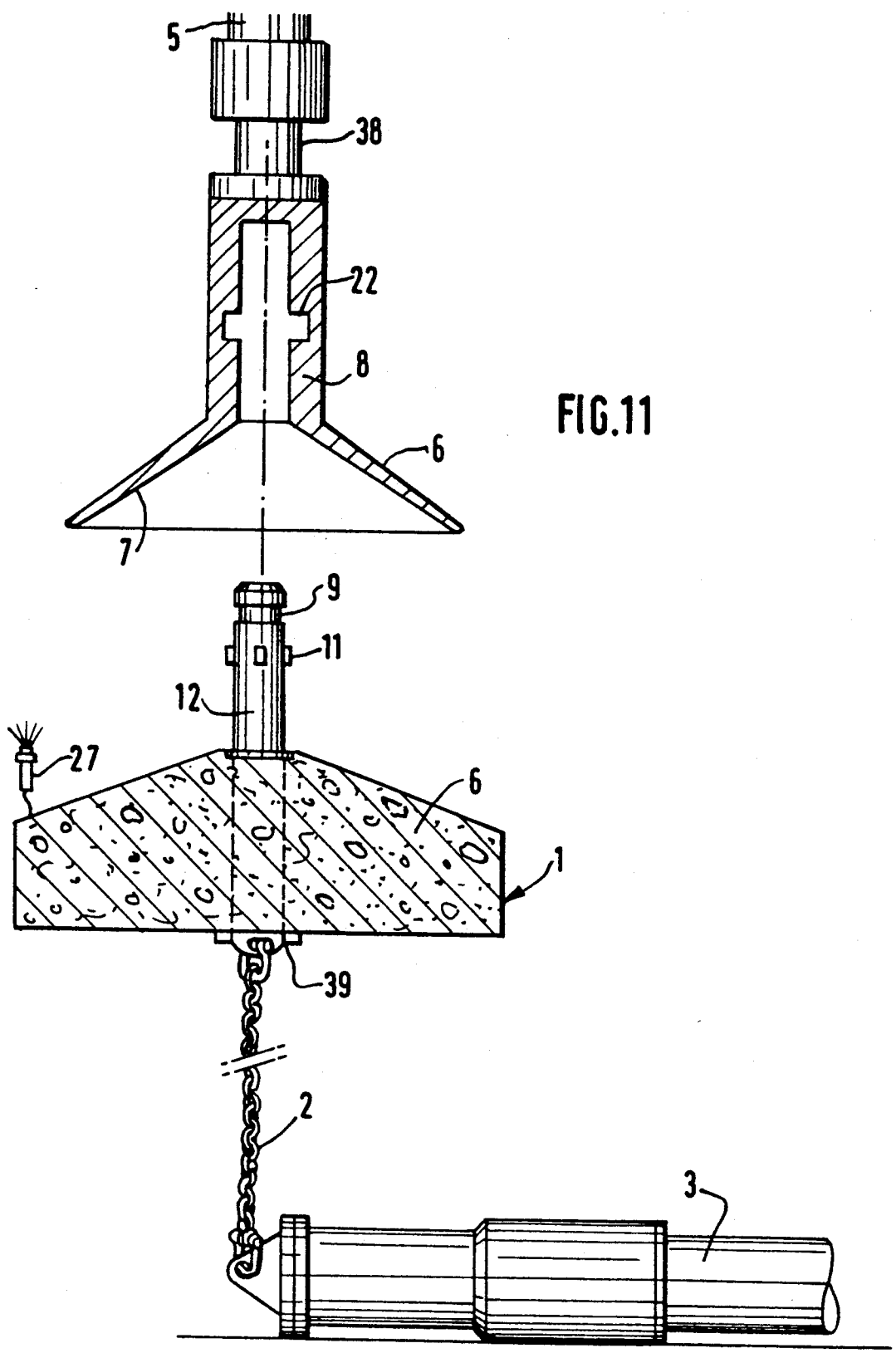

A particular embodiment of the invention will now be described by way of nonlimiting example with reference to the accompanying diagrammatical drawings in which:

FIGS. 1 to 3 represent three successive stages of the phase of releasing a hose-on the ocean floor, FIGS. 4 to 7 represent four successive stages of the phase of recovering this hose, FIG. 8 is a partial view in larger scale in axial half-section of the release mandrel, FIG. 9 is an elevation view of the recovery mandrel, FIG. 10 is a partial view in axial section of this mandrel in its receiving cylinder, and FIG. 11 represents a variant embodiment of the device according to this invention.

In FIGS. 1 to 11, the same references have been used to designate the same elements.

As shown in FIG. 1, the second device according to the invention comprises, in a general manner, a part 1 connected by a chain 2 to a hose 3 to be released on the ocean floor and a first part 4 connected, for example, by a flange, to end fitting 38 which constitutes the lower end of a release line 5 in this case consisting of a flexible pipe able to be pressurized.

Part 1 comprises a receiving cylinder 8, with a circular section and a vertical axis, whose upper end is open and connected at the lower end of a reentry cone 7 coaxial with cylinder 8 flared upward.

Reentry cone 7 consists of the upper outer surface of a buoyancy element 6 which makes it possible for part 1 to have a positive buoyancy making it possible to keep chain 2 extended, so that even when hose 3 is embedded in the earth, part 1 is accessible and the axis of the cone is vertical.

The opening of reentry cone 7 therefore is upward.

The inside wall of this cylinder forms in its upper part a circular groove 9 whose section exhibits a perpendicular, straight upper section of cylinder 8.

Further, this cylinder 8 exhibits in its lower part openings 10 in which catches 11 are mounted, as will be described in more detail below (FIG. 10).

If reference is made again to FIGS. 1 and 8, it is seen that part 4 comprises a hollow mandrel 12 whose outside surface is of circular cylindrical shape with a vertical axis and a diameter slightly smaller than the inside diameter of receiving cylinder 8. Pawls 13 are mounted to pivot around horizontal axes 14 integral with mandrel 12. In the position represented in solid lines, pawls 11 have their end 15 projecting from the mandrel through openings 16 in the wall of this mandrel, while in their position in dashes, this end 15 reenters inside the mandrel.

Further, a pressure piston 17 is mounted in mandrel 12, the inside space of mandrel 12 constitutes a cylindrical chamber in which piston 17 can slide and which communicates with the inside conduit of hose 5.

Finally, a spring 18 placed in compression between the wall of mandrel 12 and a lever 19 forming a tail of pawl 13 pushes the latter into its extended position of the mandrel.

Consequently, in the absence of pressure in hose 5, piston 17 and pawls 13 are in their position represented in solid lines, pawls 13 projecting, while when a pressure is applied in this hose, piston 17 drops into the position represented in dashes and thus makes pawls 13, whose end 15 returns inside the mandrel, swing.

If reference is made now to FIG. 1, the end of the operation of laying hose with pawls 13 of mandrel 12 engaged in groove 9 of cylinder 8 is seen, the upper face of end 15 of pawls 13 striking against the bearing surface consisting of the annular horizonal face that the upper part of groove 9 exhibits. Thanks to this arrangement, cylinder 8 is kept locked in mandrel 12 and flexible conduit 3 to be released is suspended from release hose 5 by the end of chain 2, and parts 1 and 4 attached by pawls 13. When the end of flexible tubular conduit 3 to be released, connected to chain 2, is laid on the floor, a pressure is applied inside hose 5, piston 17 causes the reentry of the pawls inside mandrel 12 as is represented in FIG. 2.

Mandrel 12 is thus disengaged from part 1 of the device according to the invention and can therefore be raised by winding on the surface of flexible tubular conduit 5 as is represented in FIG. 3. Only part 1 consequently remains connected at the end of flexible tubular conduit 3 by chain 2 while waiting to be recovered. Thanks to buoyancy element 6, part 1 has a sufficient buoyancy to lift at least one part of chain 2 whose length can be adjusted as a function of the circumstances of the operation. Preferably, chain 2 is completely extended. Advantageously, the lower zone of part 1 comprises metal elements acts as ballast and lowering its center of gravity, in particular the lower rear end of receiving cylinder 8 and the gusset to which chain 2 is connected, while a floating element 6 is in the upper zone comprising the upper front end of cylinder 8 and guiding cone 7, which has the effect of locating the center of pressure of part 1 at a sufficient distance above its center of gravity. Part 1, held by chain 2, is thus in a position above the floor and a stable orientation, with the axis of cylinder 8 and guiding cone 7 remaining approximately vertical, the flared free end of cone 7 constituting the upper face of part 1.

Figure 4:
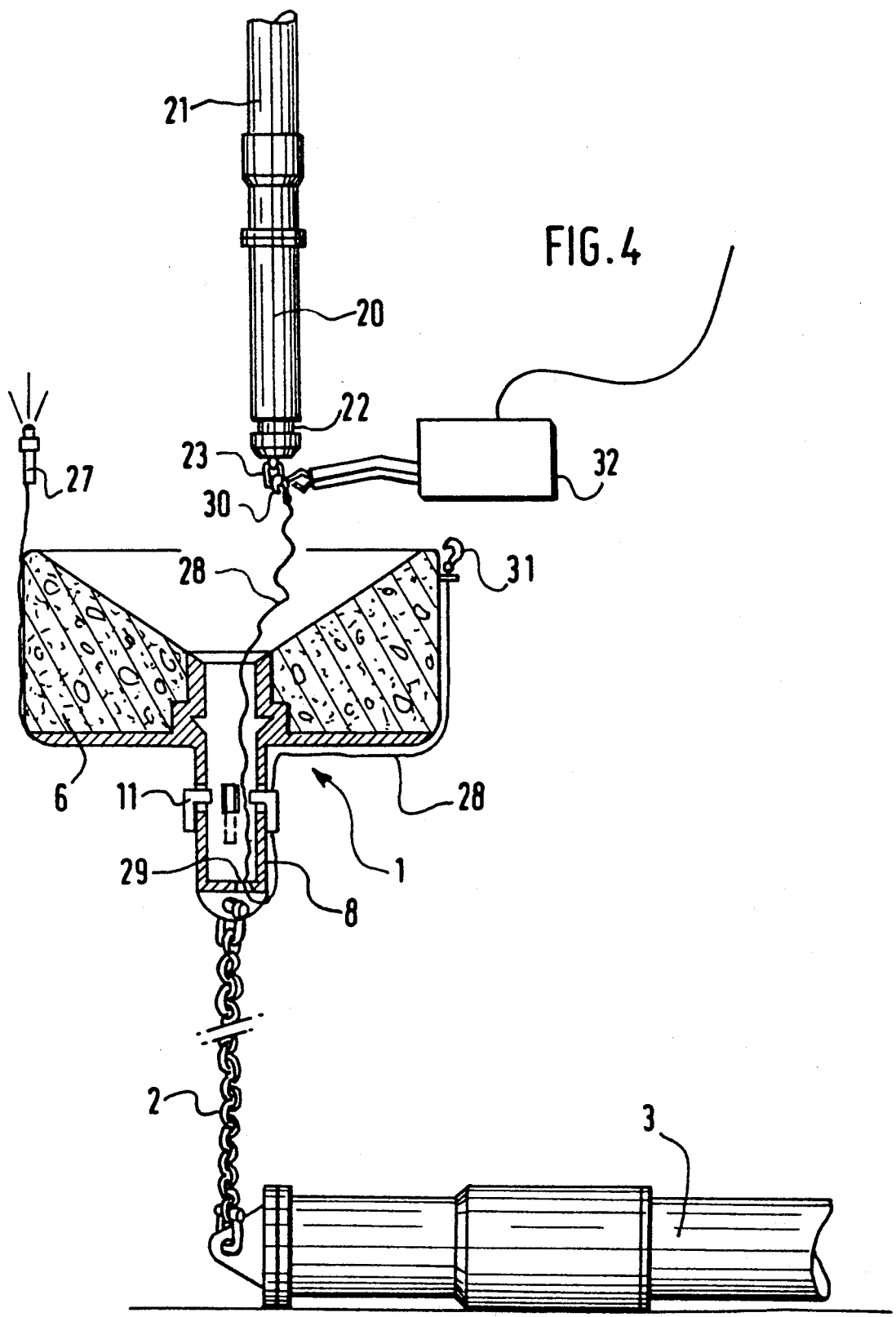

If reference is made now to FIGS. 4 and 9, it is seen that a mandrel 20, different from mandrel 12 and connected at its upper part to a lifting line 21, which can be the same as flexible tubular release conduit 3 or which can be a different flexible line, is used for this recovery.

Mandrel 20 exhibits a cylindrical outside surface, preferably circularly cylindrical, comprising at its lower part an annular groove 22 and is equipped with a ring 23 at its lower end 35.

If reference is made now to FIG. 10, it is seen that catches 11 are in the form of two-arm levers 24 and 25 and are mounted to pivot around a horizontal axis 26 integral with cylinder 8.

In the position represented in solid lines, arm 24 of the catch is swung toward the outside of cylinder 8 while in the position represented in dashes, the force of gravity being exerted on arm 25 of the catch causes the return of arm 24 projecting inside cylinder 8 through opening 10.

FIG. 4 represents mandrel 20 brought close to the entrance of reentry cone 6, this approach being facilitated with a sonar marker 27.

A sling 28 was placed on part 1 prior to its release, so that it goes through an orifice 29 formed at the bottom of cylinder 8.

Strand 28a of the sling inside part 1 has its end equipped with a hook 30 and outside strand 28b has its end equipped with a hook 31.

Mandrel 20, having been brought close to part 1, a remote-controlled submarine vehicle 32 removes hook 30 from part 1 and hooks it to ring 23 of mandrel 20.

The inside face of groove 22 of mandrel 20 exhibits the shape of a circular ring in a plane perpendicular to the vertical axis of the cylinder, and constitutes a bearing surface on which the ends come to rest.

Figure 5:
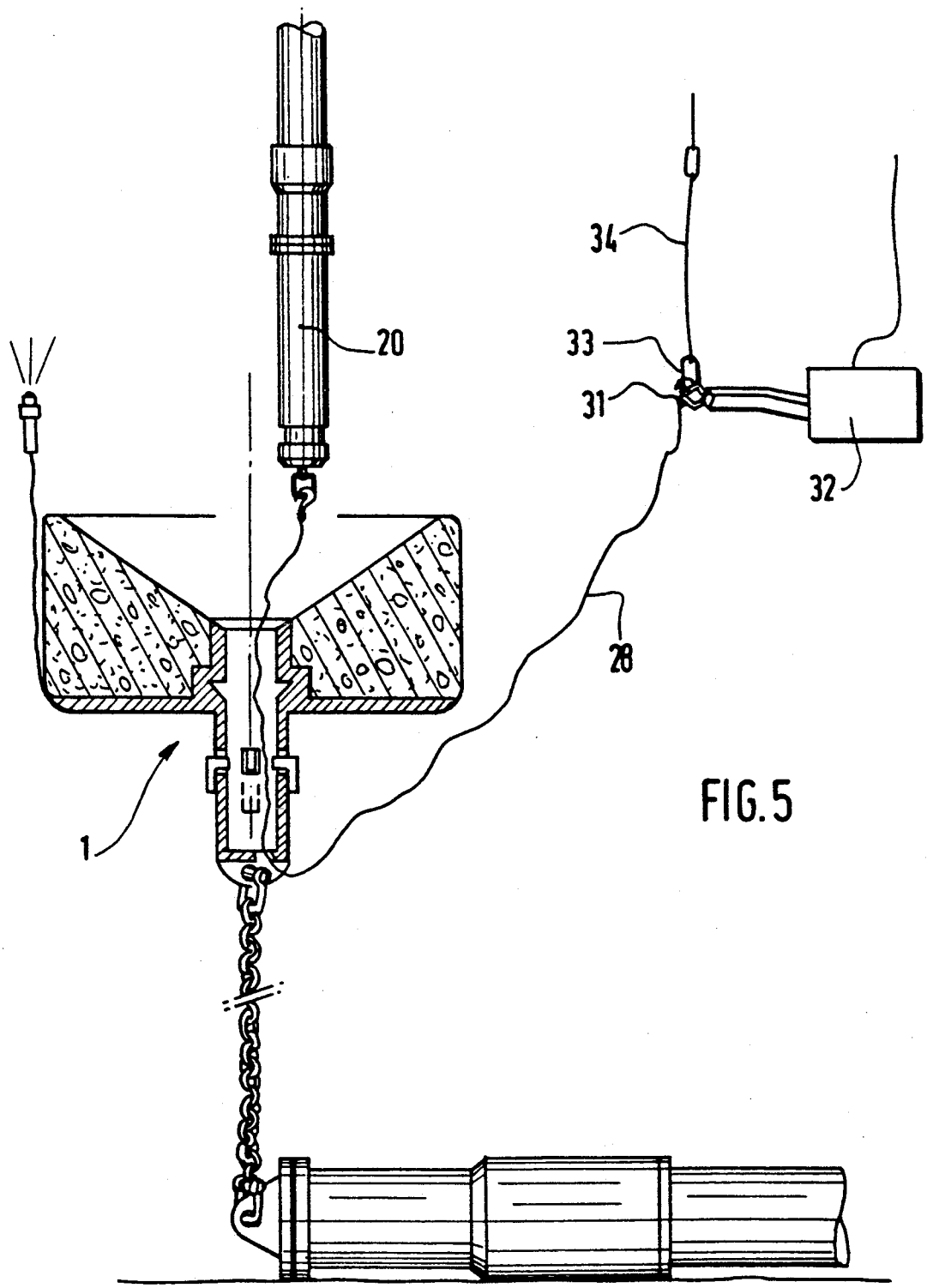

As shown in FIG. 5, it then removes hook 31 to hook it to a ring 33 connected by a traction cable 34 to a winch located on the surface.

Figure 6:
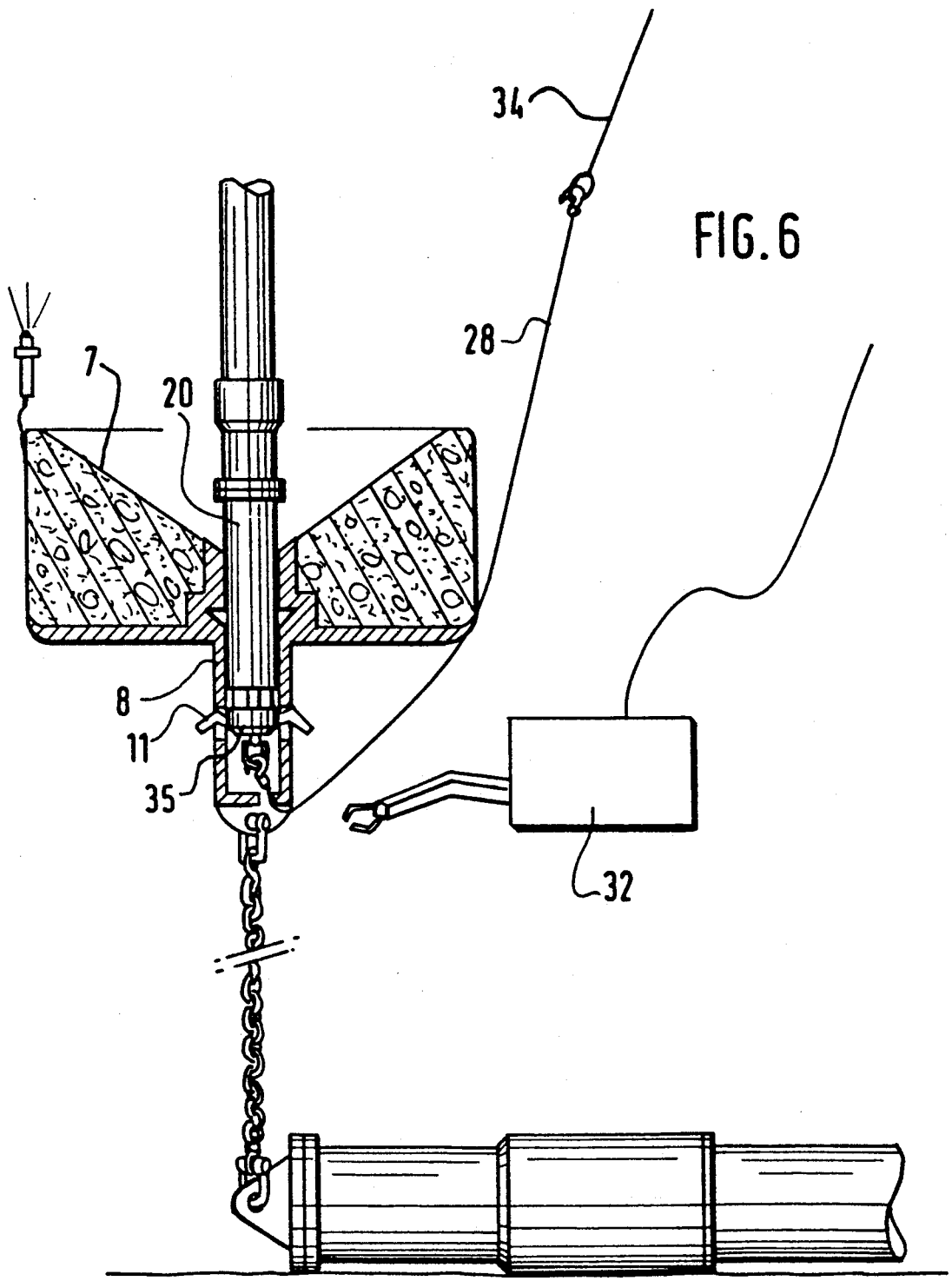
Figure 7:
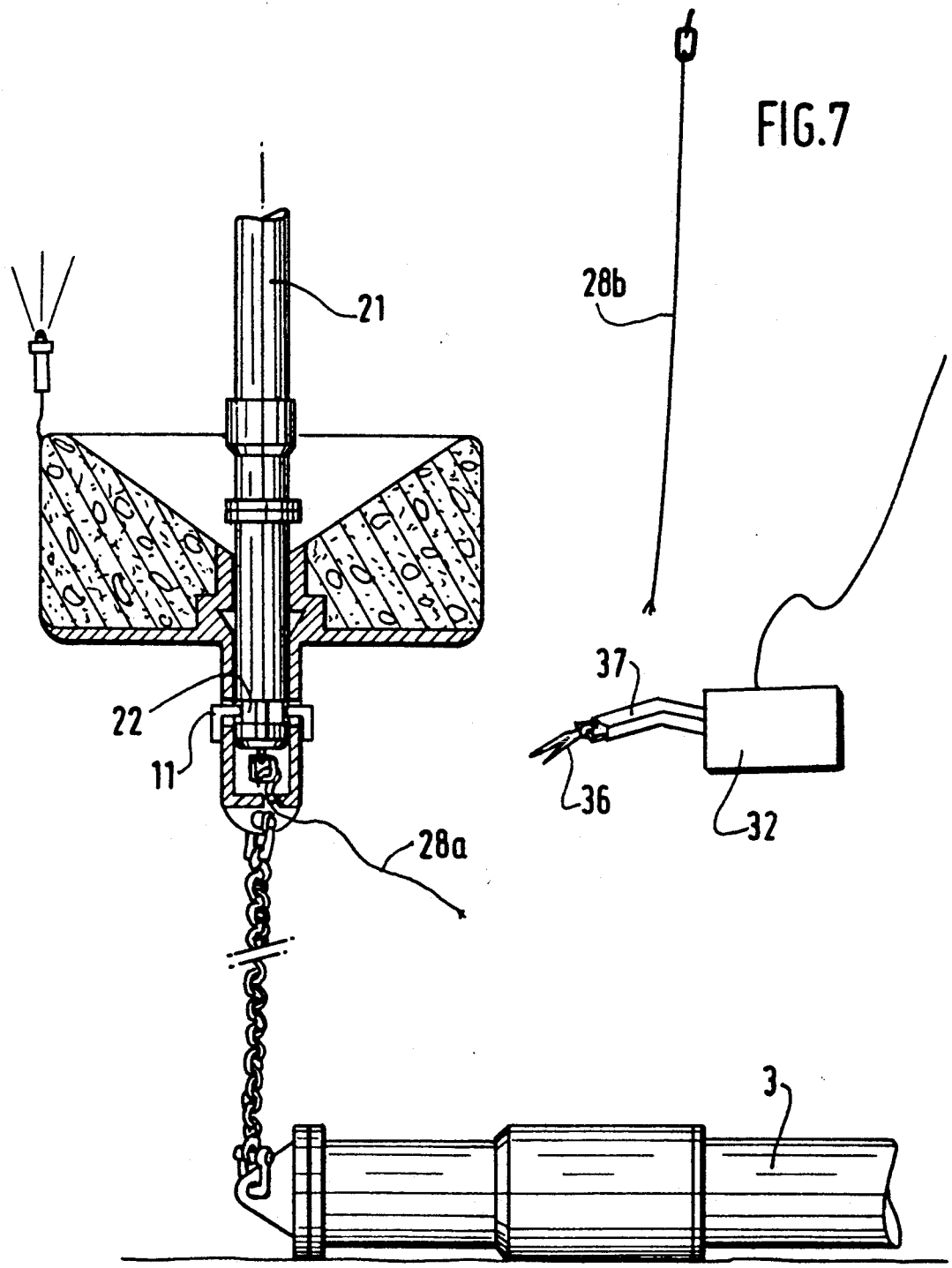

A traction being exerted on cable 34, as shown in FIG. 6, sling 28 stretches and guides mandrel 20 inside reentry cone 7 then into cylinder 8.

During the passage of lower end 35 of mandrel 20, arms 24 of catches 11 retract, then, as shown in FIG. 7, they pivot again to be engaged in groove 22. The position of the catches can be checked using vehicle 32.

The lower face of groove 22 of mandrel 20 exhibits the shape of a circular ring in a plane perpendicular to the vertical axis of the cylinder and constitutes a bearing surface on which the ends of the lower faces of arms 24 of catches 11 come to rest.

When the locking is performed, vehicle 32 can cut sling 28 with a tool 36 fastened to the end of its manipulating arm 37.

The device is then in position to lift the end of flexible tubular conduit 3 by pulling on lifting line 21.

In the embodiment illustrated in FIG. 11, conical guiding surface 7 is integrated in the last part able to be connected mechanically to line 5 for release and recovery and not to the first part connected to load 3. The connection of the second part is connected, for example, by a flange to end fitting 38 constituting the lower end of release line 5. In the example of FIG. 11, last part 1 is connected to load 3 to be recovered by chain 2, a reserve of buoyancy assuring a positive buoyancy in the second part. Second part 1 can comprise a ballast 39, placed in its lower part.

In the variant illustrated in FIG. 11, mandrel 12 is incorporated in second part 1 and receiving cylinder 8 in part 2.

Of course, the device of FIG. 11 can be equipped with all the pieces of equipment of the device illustrated in FIGS. 1 to 10 and in particular slings facilitating the connection in two parts. Moreover, since hydraulic control is advantageously assured by flexible tubular conduit 5, the hydraulically controlled device is advantageously placed in the second upper part of the device.

Various variants and modifications can, of course, be made to the preceding description without thereby going outside the scope or the spirit of the invention.

The invention mainly applies to the recovery on the ocean floor, in particular at depths on the order of 1000 meters, of flexible tubular conduits 3, whose laying has had to be interrupted with the utmost urgency by their release on the floor, for example, in the case of a storm.

We claim:

1. A device for releasing and recovering a heavy load on the ocean floor comprising a line for handling, releasing and recovering said heavy load from the ocean surface, a first part connected to a lower end of said line, and a second part having a positive buoyancy and being connected to said heavy load by an elongated flexible linking means, wherein said heavy load when on the ocean floor acts as a ballast holding said second part close to the ocean floor by means of said elongated flexible means, wherein one of said first and second parts comprises a cylindrical mandrel and the other part comprises a hollow cylinder for fittingly receiving said cylindrical mandrel, and wherein said first and second parts comprise cooperating locking means for locking said cylindrical mandrel within said hollow cylinder.

2. A device as claimed in claim 1 wherein said second part has a center of buoyancy and a center of gravity wherein said center of buoyancy is located above its center of gravity, said center of buoyancy and said center of gravity being aligned on an axis which is parallel to generatrices of the cylindrical mandrel or the hollow cylinder respectively of said second part.

3. A device as claimed in claim 1 wherein said one part comprising said cylindrical mandrel is said first part.

4. A device as claimed in claim 1 wherein said one part comprising said cylindrical mandrel is said second part.

5. A device as claimed in claim 1 wherein said other part comprising said hollow cylinder further comprises an entry cone.

6. A device as claimed in claim 1 wherein said locking means comprise movable means projecting from said mandrel and engaging an annular groove within said hollow cylinder.

7. A device as claimed in claim 6 wherein said movable means comprises at least one pivoting pawl urged towards their extended position by elastic means, piston means being provided in said mandrel to bring said pawls in their retracted position.

8. A device as claimed in claim 7 wherein said piston means are hydraulic piston means actuated by a hydraulic fluid conveyed by the handling line.

9. A device as claimed in claim 1 wherein said locking means comprise pivoting catches projecting from said hollow cylinder and engaging an annular groove on an outside surface of said mandrel.

10. A device as claimed in claim 1 further comprising a sling extending through said hollow cylinder and provided at both ends with hooking means for connection to said mandrel and to at traction cable respectively.

11. A device as claimed in claim 1 wherein said flexible means connecting said load to said second part comprises a chain.

* * * * *